(12) United States Patent
Fujiwara et al.

(10) Patent No.: US 8,915,228 B2
(45) Date of Patent: Dec. 23, 2014

(54) ENGINE AUTOMATIC STOP AND RESTART APPARATUS AND ENGINE AUTOMATIC STOP AND RESTART METHOD

(75) Inventors: Michitaka Fujiwara, Kobe (JP); Tsuneo Tanabe, Kobe (JP)

(73) Assignee: Mitsubishi Electric Corporation, Tokyo (JP)

( * ) Notice: Subject to any disclaimer, the term of this patent is extended or adjusted under 35 U.S.C. 154(b) by 375 days.

(21) Appl. No.: 13/416,701

(22) Filed: Mar. 9, 2012

(65) Prior Publication Data

US 2013/0080037 A1    Mar. 28, 2013

(30) Foreign Application Priority Data

Sep. 27, 2011    (JP) ................. 2011-210301

(51) Int. Cl.
*F02N 11/08* (2006.01)
*F02N 99/00* (2010.01)

(52) U.S. Cl.
CPC ........ *F02N 11/0822* (2013.01); *F02N 11/0844* (2013.01); *F02N 11/0855* (2013.01); *F02N 99/006* (2013.01); *F02N 2200/021* (2013.01); *F02N 2200/022* (2013.01); *F02N 2200/063* (2013.01); *Y02T 10/48* (2013.01)
USPC .............. 123/179.4; 123/179.25; 123/179.28; 701/112; 701/113

(58) Field of Classification Search
CPC ............ F02N 11/0818; F02N 11/0844; F02N 11/0855
USPC ................. 123/179.3, 179.4, 179.25, 179.28; 701/112, 113; 73/114.58, 114.59, 73/114.61

See application file for complete search history.

(56) References Cited

U.S. PATENT DOCUMENTS

2012/0103292 A1*   5/2012   Fujiwara et al. ........... 123/179.4

FOREIGN PATENT DOCUMENTS

| CN | 102086830 A | 6/2011 |
| DE | 10 2010 061 084 A1 | 7/2011 |
| JP | 2010-270635 A | 12/2010 |

OTHER PUBLICATIONS

German Office Action dated Aug. 16, 2013 issued in German Patent Application No. 10 2012 204 531.7.
Chinese Office Action dated Aug. 29, 2014 issued in corresponding Chinese Patent Application No. 201210102440.9.

* cited by examiner

*Primary Examiner* — Hai Huynh
(74) *Attorney, Agent, or Firm* — Sughrue Mion, PLLC; Richard C. Turner

(57) ABSTRACT

An engine control section (50) is configured to: start power supply to pinion-gear moving sections (21, 22) based on an engine rpm which becomes smaller than an rpm at which the meshing engagement is possible while the engine is rotating by inertia as a result of satisfaction of an automatic stop condition; temporarily stop the power supply to the pinion-gear moving sections when an amount of change in the rpm of the engine exceeds a predetermined increase detection threshold value before time required for a pinion gear (24) to come into abutment against a ring gear (12) elapses after the start of the power supply; and restart the power supply to the pinion-gear moving sections when the amount of change in the rpm of the engine becomes smaller than a predetermined decrease detection threshold value after the power supply is temporarily stopped.

9 Claims, 9 Drawing Sheets

(a) MAP Mth_b BASED ON POWER-SUPPLY TIME T1 OF (b) MAP Mth_vb BASED ON BATTERY VOLTAGE (c) MAP Mth_ag BASED ON CRANK ANGLE

ENGINE AUTOMATIC STOP AND RESTART APPARATUS AND ENGINE AUTOMATIC STOP AND RESTART METHOD

BACKGROUND OF THE INVENTION

1. Field of the Invention

The present invention relates to an engine automatic stop and restart apparatus and an engine automatic stop and restart method, which automatically stop an engine when an automatic stop condition is satisfied, and restart the engine when a restart condition is satisfied thereafter.

2. Description of the Related Art

In recent years, there is developed an engine automatic stop and restart apparatus for the purpose of improving fuel consumption of a vehicle such as an automobile and reducing environmental load, in which when a driver's operation satisfies a predetermined condition for stopping an engine (for example, when a pedaling operation of a brake pedal is performed while a vehicle is moving at a speed lower than a predetermined speed), fuel supply is automatically cut off so that the engine is automatically stopped, and after that, when a driver's operation satisfies a predetermined condition for restarting the engine (for example, a releasing operation of the brake pedal, a pedaling operation of an accelerator pedal, and the like), fuel injection is restarted so that the engine is automatically restarted.

As the engine automatic stop and restart apparatus described above, the following apparatus has been conventionally proposed. When an engine rpm becomes equal to or smaller than a predetermined rpm while the engine is rotating by inertia after an operation of automatically stopping the engine is performed, the engine rpm is predicted and calculated in an interval in which the engine rpm is on a decreasing trend. Timing at which a pinion gear is driven is controlled based on meshing-operation time required for a meshing operation of the pinion gear so that the pinion gear comes into meshing engagement with a ring gear when or immediately before the engine rpm becomes zero (for example, see Japanese Patent Application Laid-open No. 2010-276035).

In the above-mentioned conventional apparatus disclosed in Japanese Patent Application Laid-open No. 2010-276035, a state in which the pinion gear and the ring gear are brought into meshing engagement is realized when or immediately before the engine rpm becomes zero. Therefore, the noise generated by meshing engagement can be suppressed.

However, the conventional apparatus has the following problem.

As described above, the conventional apparatus disclosed in Japanese Patent Application Laid-open No. 2010-276035 predicts the engine rpm in the interval in which the engine rpm is on a decreasing trend, which is determined based on the determination that a piston of the engine is at the last top dead center (hereinafter, referred to as "TDC") after the operation of automatically stopping the engine is performed. In this manner, the control is performed based on the meshing-operation time required for the meshing operation of the pinion gear so that the pinion gear and the ring gear are brought into meshing engagement with each other when or immediately before the engine rpm becomes zero.

For determining the interval in which the engine rpm is on a decreasing trend, whether or not the piston of the engine is at the last TDC is determined. For precisely determining the last TDC, however, the determination is required to be performed by an engine control unit for controlling the engine in view of a load state of the engine, a change of the engine with elapse of time, and the like.

For example, if the load on the engine fluctuates after the determination that the piston of the engine is at the last TDC, and if the degree of decrease in engine rpm becomes smaller and the piston passes through the TDC immediately before the engine is stopped, the engine rpm increases. As a result, at the timing at which the pinion gear comes into meshing engagement with the ring gear, the engine rpm is not zero or not in the vicinity of zero. Therefore, there has been a problem in that the meshing engagement between the pinion gear and the ring gear is not completed until the engine rpm has the trend of decreasing again, resulting in generation of noise.

SUMMARY OF THE INVENTION

The present invention has been made to solve the problem described above, and therefore has an object to provide an engine automatic stop and restart apparatus and an engine automatic stop and restart method, capable of suppressing the generation of noise when a pinion gear and a ring gear are brought into meshing engagement with each other to prevent the pinion gear and the ring gear from being worn.

The present invention provides an engine automatic stop and restart apparatus for performing automatic stop control for an engine when an automatic stop condition is satisfied while a vehicle is running and performing restart control for the engine when a restart condition is thereafter satisfied, the engine automatic stop and restart apparatus including: a ring gear provided to a crankshaft of the engine; a pinion gear for transferring rotation of a starter motor for starting the engine to the ring gear; pinion-gear moving means for moving the pinion gear by power supply so as to achieve meshing engagement with the ring gear; and an engine control section for performing the automatic stop control and the restart control based on an rpm of the engine, in which the engine control section is configured to: start the power supply to the pinion-gear moving means when the rpm of the engine becomes smaller than an rpm at which the meshing engagement between the pinion gear and the ring gear is possible while the engine is rotating by inertia as a result of satisfaction of the automatic stop condition; temporarily stop the power supply to the pinion-gear moving means when an increase in the rpm of the engine is detected based on a fact that an amount of change in the rpm of the engine exceeds a predetermined increase detection threshold value before time required for the pinion gear to come into abutment against the ring gear elapses after the start of the power supply to the pinion-gear moving means; and restart the power supply to the pinion-gear moving means when a decrease in the rpm of the engine is detected based on a fact that the amount of change in the rpm of the engine becomes smaller than a predetermined decrease detection threshold value after the power supply to the pinion-gear moving means is temporarily stopped.

Further, the present invention provides an engine automatic stop and restart method to be used for an engine automatic stop and restart apparatus for performing automatic stop control for an engine when an automatic stop condition is satisfied while a vehicle is running and performing restart control for the engine when a restart condition is thereafter satisfied, the engine automatic stop and restart apparatus including: a ring gear provided to a crankshaft of the engine; a pinion gear for transferring rotation of a starter motor for starting the engine to the ring gear; pinion-gear moving means for moving the pinion gear by power supply so as to achieve meshing engagement with the ring gear; and an engine control section for performing the automatic stop control and the restart control based on an rpm of the engine, the engine automatic stop and restart method including: a first step of starting the power supply to the pinion-gear moving means when the rpm of the engine becomes smaller than an rpm at which the meshing engagement between the pinion gear and the ring gear is possible while the engine is rotating by inertia as a result of satisfaction of the automatic stop condition; a second step of temporarily stopping the power supply to the pinion-gear moving means when an increase in the rpm of the engine is detected based on a fact that an amount of change in the rpm of the engine exceeds a predetermined increase detection threshold value before time required for the pinion gear to come into abutment against the ring gear elapses after the start of the power supply to the pinion-gear moving means in the first step; and a third step of restarting the power supply to the pinion-gear moving means when a decrease in the rpm of the engine is detected based on a fact that the amount of change in the rpm of the engine becomes smaller than a predetermined decrease detection threshold value after the power supply to the pinion-gear moving means is temporarily stopped in the second step.

According to the engine automatic stop and restart apparatus and the engine automatic stop and restart method of the present invention, when the trend of the engine rpm changes from decreasing to increasing after the start of an operation of bringing the pinion gear into meshing engagement with the ring gear while the engine is rotating by inertia after an operation of automatically stopping the engine is performed, the operation of bringing the pinion gear into meshing engagement with the ring gear is stopped. As a result, the engine automatic stop and restart apparatus and the engine automatic stop and restart method, capable of suppressing the noise generated when the pinion gear and the ring gear are brought into meshing engagement to prevent the pinion gear and the ring gear from being worn, can be obtained.

DETAILED DESCRIPTION OF THE PREFERRED EMBODIMENT

Figure 1:
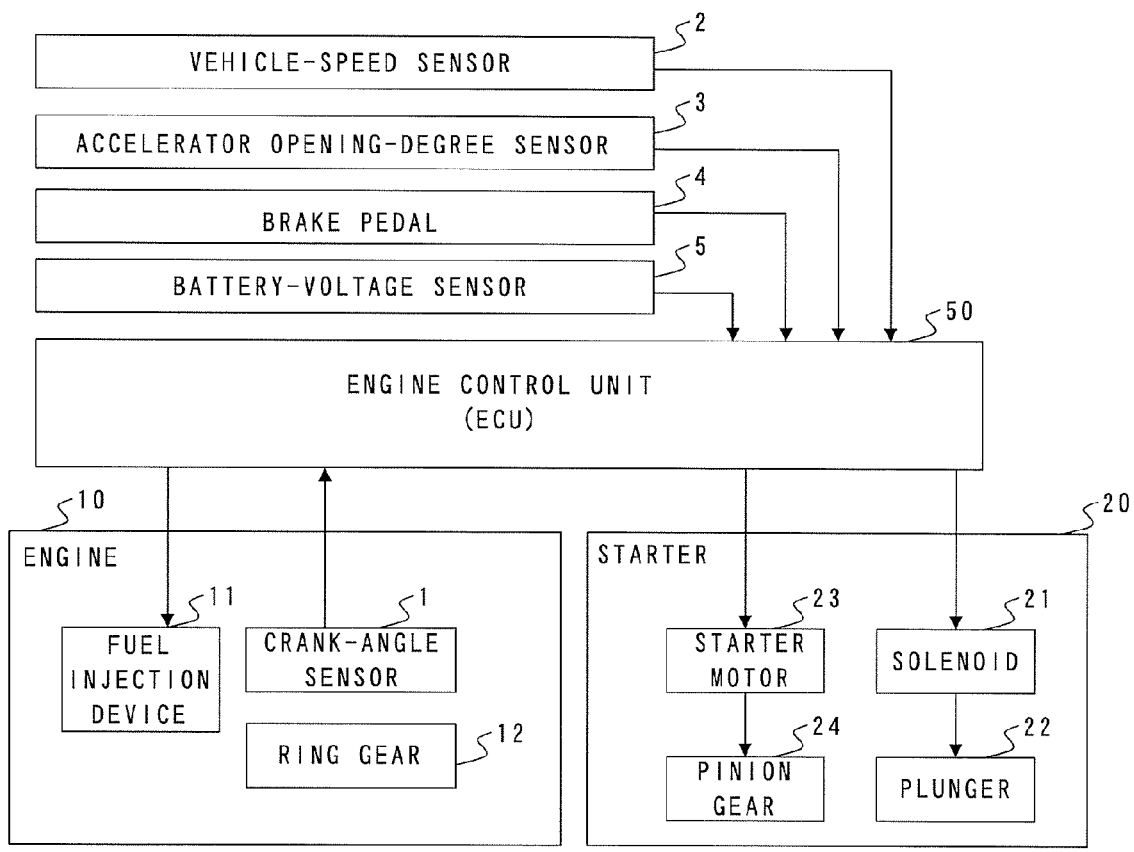
FIG. 1 is a block diagram illustrating a configuration of an engine automatic stop and restart apparatus according to a first embodiment of the present invention.

Hereinafter, an engine automatic stop and restart apparatus and an engine automatic stop and restart method of the present invention are described in detail referring to the accompanying drawings. In the drawings, the same reference numeral denotes the same or equivalent part.

First Embodiment

FIG. 1 is a block diagram illustrating a configuration of an engine automatic stop and restart apparatus according to a first embodiment of the present invention. The engine automatic stop and restart apparatus illustrated in FIG. 1 according to the first embodiment includes an engine 10, a starter 20, and an engine control unit (ECU) 50.

The engine 10 includes a fuel injection device 11 which supplies a fuel to the engine 10. A ring gear 12 is provided to a crankshaft of the engine 10.

The starter 20 includes a solenoid 21, a plunger 22, a starter motor 23, and a pinion gear 24. The solenoid 21 and the plunger 22 correspond to pinion-gear moving means. The pinion gear 24 is provided to a rotary shaft of the starter motor 23, which is rotated when supplied with power. When the solenoid 21 is supplied with power, the plunger 22 pushes out the pinion gear 24 toward the rotary shaft to bring the pinion gear 24 into meshing engagement with the ring gear 12 provided to the crankshaft of the engine 10.

The engine control unit (electric control unit (ECU)) 50 controls the fuel injection device 11 and determines the satisfaction of an automatic stop condition or a restart condition. The engine control unit 50 connects a power source and the starter motor 23 as needed to supply power to the starter motor 23, and connects the power source and the solenoid 21 as needed to supply power to the solenoid 21.

A crank-angle sensor 1, a vehicle-speed sensor 2, an accelerator opening-degree sensor 3, a brake pedal 4, and a battery-voltage sensor 5 are connected as various sensors to the engine control unit 50. The crank-angle sensor 1 detects a crank angle of the engine. The vehicle-speed sensor 2 detects a speed of a vehicle to output a vehicle-speed signal. The accelerator opening-degree sensor 3 detects an accelerator opening degree to output an accelerator opening-degree signal. The brake pedal 4 outputs a brake signal indicating an operating condition of the pedal. Further, the battery-voltage sensor 5 detects a voltage of a battery.

Note that, although not illustrated, the engine control unit 50 includes various I/F circuits and a microcomputer. In addition, the microcomputer includes: an A/D converter which converts analog signals such as detection signals of the above-mentioned various sensors into digital signals; a CPU which executes various control programs such as an engine automatic stop and restart control program; a ROM which stores the engine automatic stop and restart control program, various control programs, control constants, various tables, and the like; and a RAM which stores variables and the like when the various control programs are executed.

Figure 2:
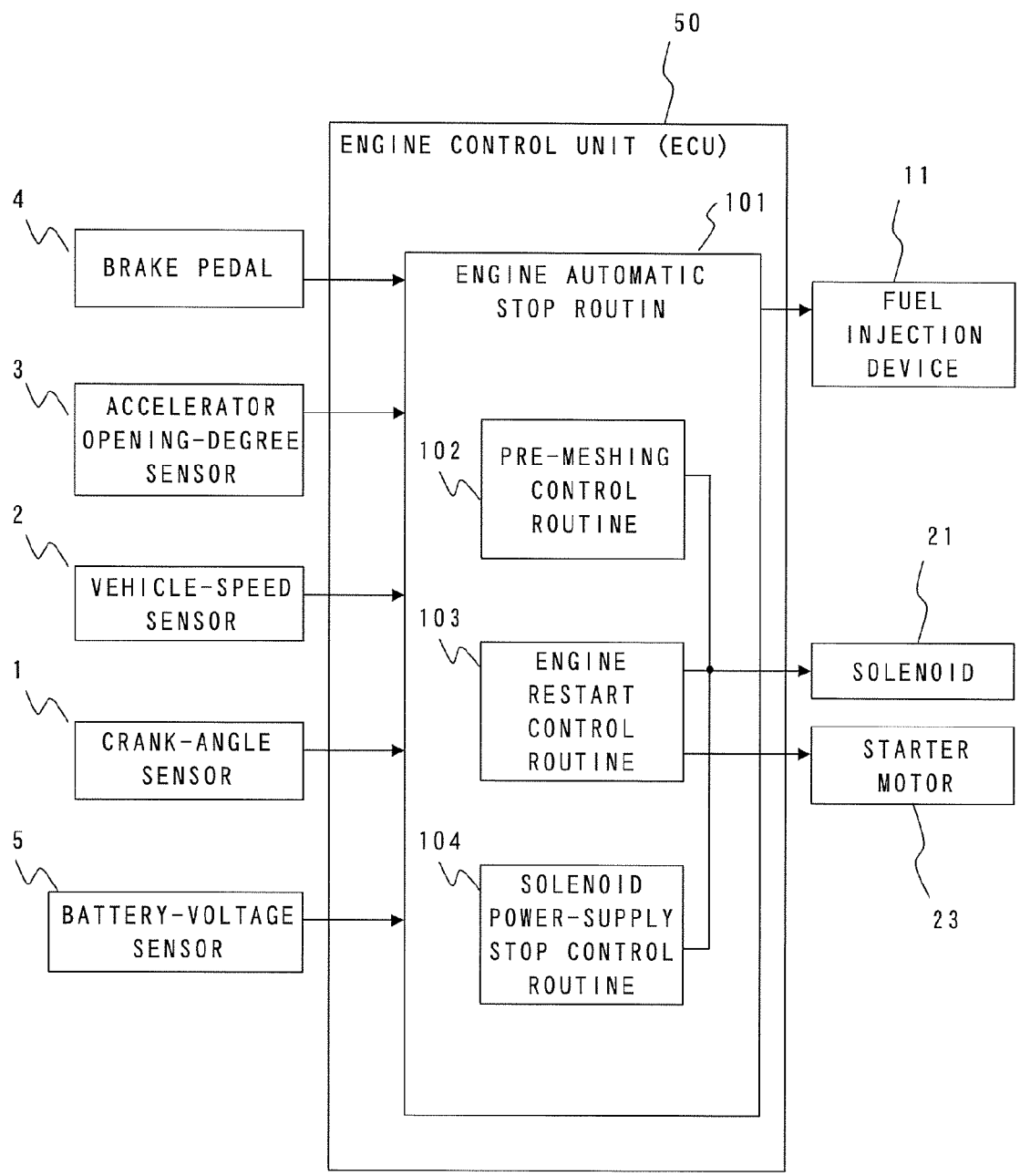
FIG. 2 is a control block diagram of the engine automatic stop and restart apparatus according to the first embodiment of the present invention.

FIG. 2 is a control block diagram of the engine automatic stop and restart apparatus according to the first embodiment of the present invention and illustrates a configuration of each process routine. In FIG. 2, an engine automatic stop routine 101 provided to the engine control unit 50 first uses information from the vehicle-speed sensor 2, the accelerator opening-degree sensor 3, and the brake pedal 4 to determine an automatic stop of the engine to stop the fuel injection device 11. The engine automatic stop routine 101 manages whether or not an automatic stop request based on the determination of the automatic stop of the engine is made, as an automatic stop request flag F1.

Next, the engine automatic stop routine 101 uses information from the acceleration opening-degree sensor 3 and the brake pedal 4 to determine that a restart condition of the engine is satisfied. Then, when determining that the restart condition of the engine is satisfied, the engine automatic stop routine 101 starts an engine restart control routine 103 to supply power to and control the solenoid 21 and the starter motor 23 of the starter 20 to thereby restart the engine.

A pre-meshing control routine 102 performs control for previously bringing the pinion gear 24 into meshing engagement with the ring gear 12 in preparation for a restart request based on a driver's operation, from an engine rpm computed based on a detection cycle of the crank-angle sensor 1.

A solenoid power-supply stop control routine 104 uses information indicating the start of power supply to the solenoid 21, power-supply time to the solenoid 21, the engine rpm, and information from the crank-angle sensor 1 and the battery-voltage sensor 5 of the engine to perform control so as to temporarily stop the power supply to the solenoid 21 for bringing the pinion gear 24 into meshing engagement with the ring gear 12 in the pre-meshing control routine 102 and the engine restart control routine 103.

Next, an operation of the engine automatic stop and restart apparatus according to the first embodiment of the present invention is described referring to FIGS. 3 to 6. Processes illustrated in FIGS. 3 to 6 are executed in a fixed cycle of, for example, 5 msec. In FIGS. 3 to 6, processes performed in Steps S101 to S108, Steps S201 to S203, Steps S301 to S309, and Steps S401 to S409 are executed by the engine automatic stop and restart control program stored in the ROM of the engine control unit 50.

When an ignition switch of a vehicle is turned ON, power is supplied from an on-vehicle battery so that the engine control unit 50 starts the operation. Then, the CPU configured by the microcomputer provided in the engine control unit 50 executes the engine automatic stop and restart control program stored in the ROM in the following manner.

Figure 3:
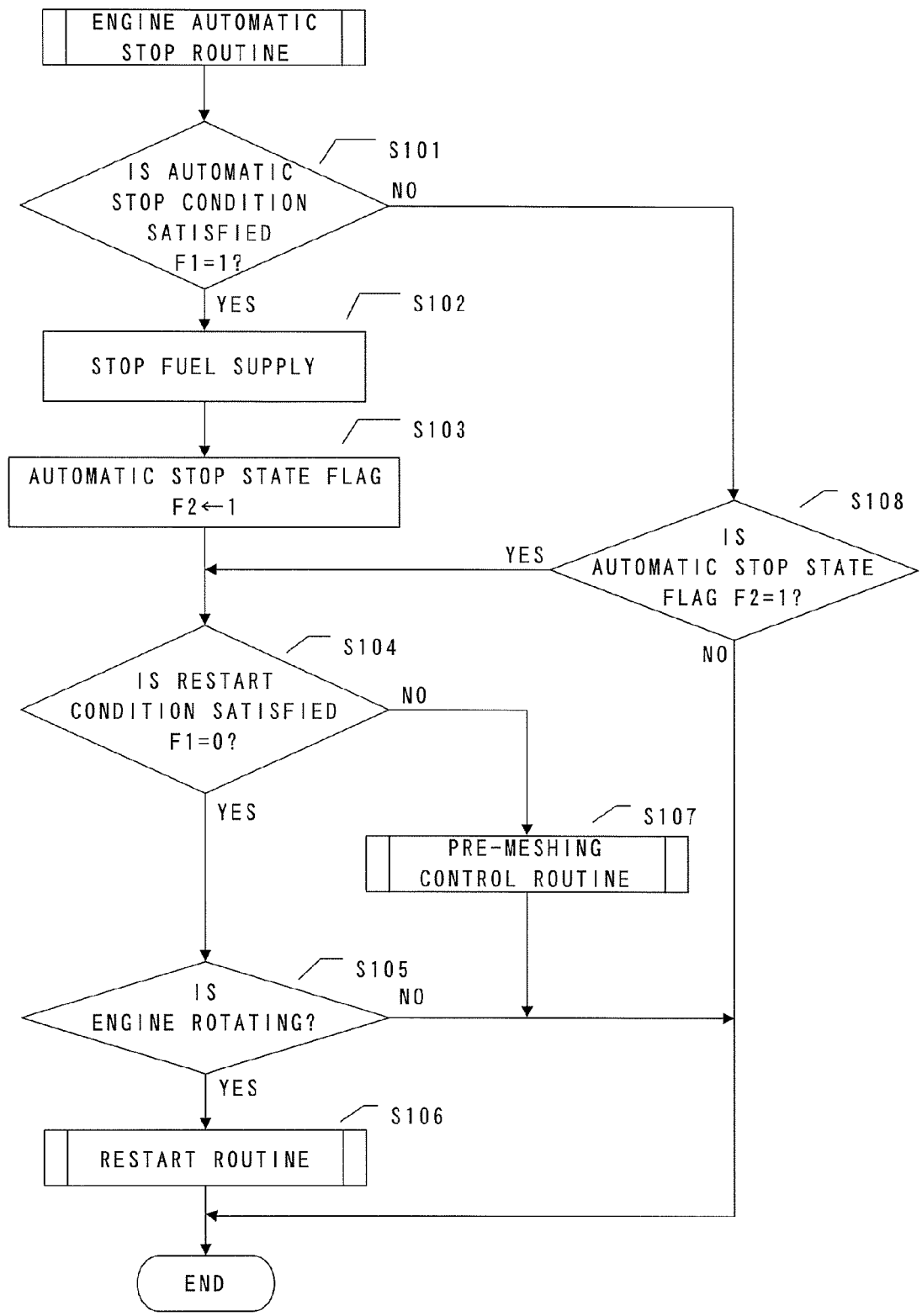
FIG. 3 is a flowchart illustrating an engine automatic stop routine performed in the engine automatic stop and restart apparatus according to the first embodiment of the present invention.

First, the details of the above-mentioned engine automatic stop routine 101 illustrated in FIG. 2 are described referring to FIG. 3. FIG. 3 is a flowchart illustrating the engine automatic stop routine 101 performed in the engine automatic stop and restart apparatus according to the first embodiment of the present invention. First, in Step S101, the microcomputer of the engine control unit 50 (hereinafter, referred to as "engine control unit 50" simply) determines whether or not the automatic stop condition is satisfied.

This automatic stop condition is, for example, an operation state in which the vehicle speed is 10 km/h or lower and the driver is pedaling the brake pedal 4. The vehicle speed is based on the vehicle-speed signal output from the vehicle-speed sensor 2. The operation state in which the brake pedal 4 is pedaled is based on an ON state of the brake signal output from the brake pedal 4.

When the engine control unit 50 determines that the automatic stop condition is satisfied (the engine automatic stop request flag F1 is set to "1") (YES), the process proceeds to next Step S102. On the other hand, when the engine control unit 50 determines that the automatic stop condition is not satisfied (NO), the process proceeds to Step S108.

When the process proceeds to Step S102, the engine control unit 50 controls the fuel injection device 11 to stop the fuel injection to the engine 10. Next, in Step S103, the engine control unit 50 sets an automatic stop state flag F2 to "1".

Next, in Step S104, the engine control unit 50 determines whether or not the restart condition is satisfied. The restart condition corresponds to, for example, an operation state in which the driver releases the brake pedal and the driver is pedaling the accelerator pedal. The operation state in which the brake pedal 4 is released is based on an OFF state of the brake signal output from the brake pedal 4. The operation state in which the accelerator pedal is pedaled is based on the accelerator opening-degree signal output from the accelerator opening-degree sensor 3.

Then, when the engine control unit 50 determines in Step S104 that the restart condition is satisfied (the engine automatic stop request flag F1 is cleared to "0") (YES), the process proceeds to next Step S105. On the other hand, when the engine control unit 50 determines that the restart condition is not satisfied (NO), the process proceeds to Step S107.

Next, in Step S105, the engine control unit 50 determines whether or not the engine 10 is rotating. Then, when the engine control unit 50 determines that the engine 10 is rotating (YES), the process proceeds to next Step S106. When the engine 10 is not rotating, namely when the engine is stopped completely (NO), the process is finished.

Next, in Step S106, the engine control unit 50 performs the engine restart control routine illustrated in FIG. 5, which is described later.

When determining in previous Step S104 that the restart condition is not satisfied, specifically, the engine is automatically stopped and is currently in a stopped state, the engine control unit 50 executes in Step S107 the pre-meshing control routine described below and illustrated in FIG. 4 so as to previously bring the pinion gear 24 into engagement with the ring gear 12 in preparation for the restart based on the driver's operation. Then, the process is finished.

Further, in Step S108, the engine control unit 50 determines whether or not the automatic stop state flag F2 is "1". When the engine control unit 50 determines that the automatic stop state flag F2 is "1" (YES), it is determined that the engine 10 is stopped automatically, and the process proceeds to Step S104 to determine whether or not the restart condition is satisfied. On the other hand, when it is determined that the automatic stop state flag F2 is "0" (NO), it is determined that the engine 10 is not stopped automatically, and the process is finished.

Figure 4:
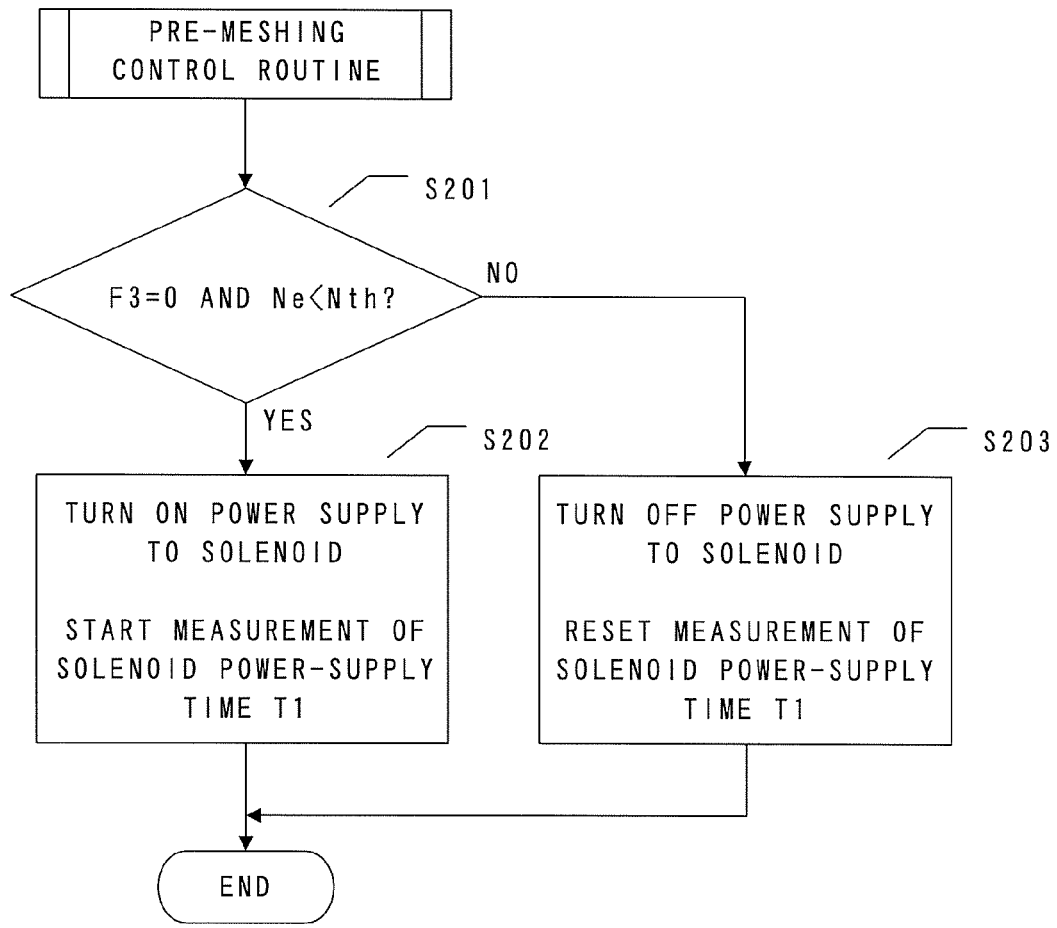
FIG. 4 is a flowchart illustrating a pre-meshing control routine performed in the engine automatic stop and restart apparatus according to the first embodiment of the present invention.

Next, the details of the above-mentioned pre-meshing control routine 102 illustrated in FIG. 2 are described referring to FIG. 4. FIG. 4 is a flowchart illustrating the pre-meshing control routine performed in the engine automatic stop and restart apparatus according to the first embodiment of the present invention. First, in Step S201, the engine control unit 50 determines whether or not a solenoid power-supply stop control flag F3 described below is "0" and whether or not an engine rpm Ne is smaller than an rpm threshold value Nth.

Then, when the engine control unit 50 determines that the solenoid power-supply stop control flag F3 is "0" and the engine rpm Ne is smaller than the rpm threshold value Nth (YES), the process proceeds to next Step S202. On the other hand, when the engine control unit 50 determines that the solenoid power-supply stop control flag F3 is not "0" or the engine rpm Ne is not smaller than the rpm threshold value Nth (NO), the process proceeds to Step S203.

The rpm threshold value Nth is a value which allows the achievement of the meshing engagement at the engine rpm of 0 rpm or in the vicinity of 0 rpm in view of time required for achieving the meshing engagement of the pinion gear 24 and the ring gear 12 after the start of the power supply to the solenoid 21, and is, for example, 200 rpm.

When the process proceeds to Step S202, the engine control unit 50 turns ON the power supply to the solenoid 21. Further, the engine control unit 50 starts a measurement of a power-supply time T1 of the solenoid 21 and then, terminates the control described above.

On the other hand, when the process proceeds to Step S203, the engine control unit 50 turns OFF the power supply to the solenoid 21 of the starter 20. Further, the engine control unit 50 ends and resets the measurement of the power-supply time T1 of the solenoid 21 and then, terminates the control described above. In this case, an attraction force is not generated between the solenoid 21 and the plunger 22. Therefore, the plunger 22 does not move in an axial direction of the rotary shaft of the starter motor 23. As a result, the pinion gear 24 is not pushed in the axial direction, resulting in a state in which the pinion gear 24 and the ring gear 12 are not brought into meshing engagement with each other.

Figure 5:
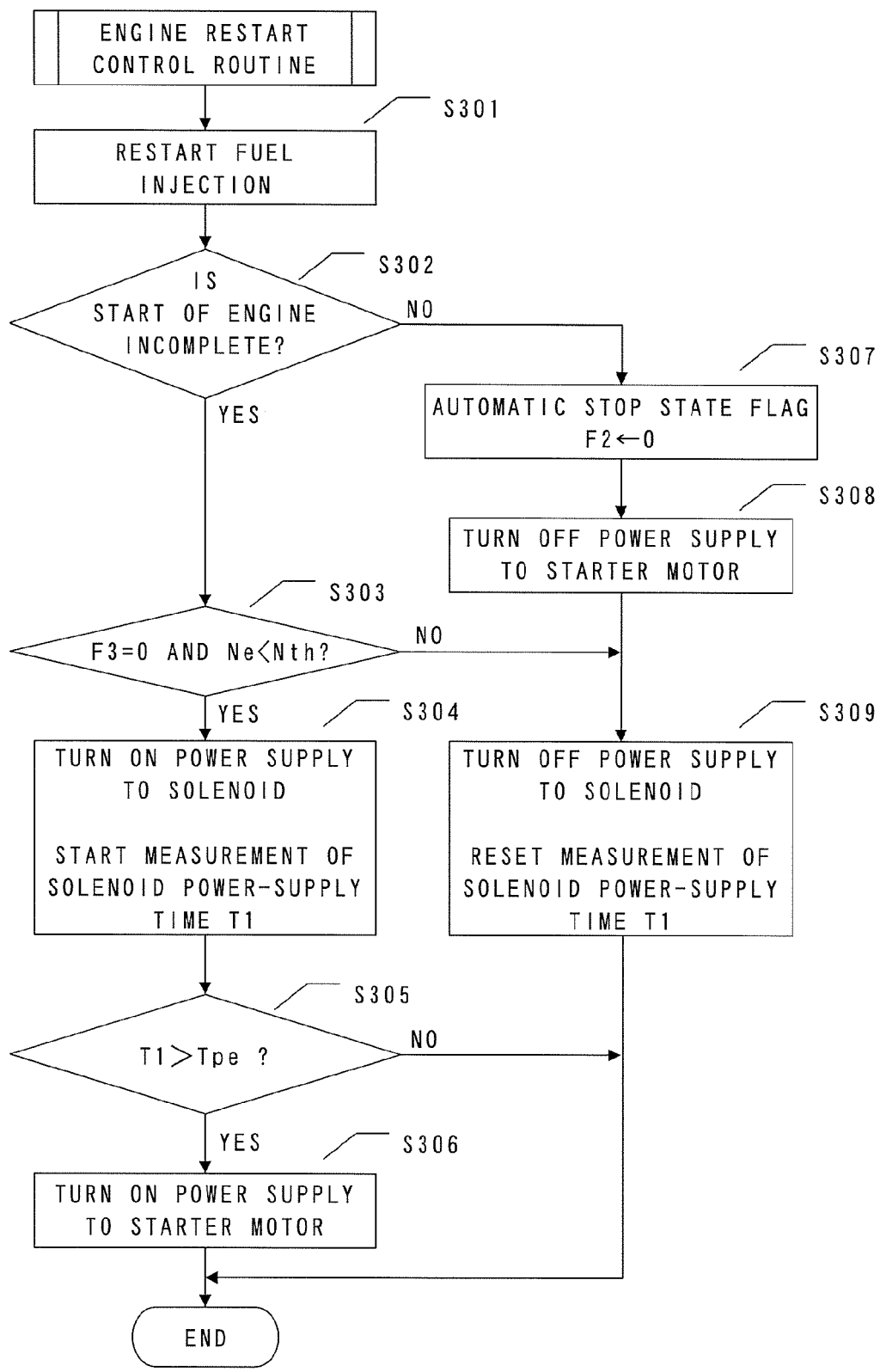
FIG. 5 is a flowchart illustrating an engine restart control routine performed in the engine automatic stop and restart apparatus according to the first embodiment of the present invention.

Next, the details of the above-mentioned engine restart control routine 103 illustrated in FIG. 2 are described referring to FIG. 5. FIG. 5 is a flowchart illustrating the engine restart control routine performed in the engine automatic stop and restart apparatus according to the first embodiment of the present invention. First, in Step S301, the engine control unit 50 controls the fuel injection device 11 to inject a starting fuel to the engine 10.

Next, in Step S302, the engine control unit 50 determines based on the engine rpm whether or not the engine 10 is started. Then, when the engine control unit 50 determines that the engine 10 is not started, specifically, the engine rpm is smaller than the predetermined value (YES), the process proceeds to next Step S303.

On the other hand, when determining that the engine 10 is started, specifically, the engine rpm is equal to or larger than the predetermined value (NO), the engine control unit 50 determines that the engine 10 is started by combustion and the process proceeds to Step S307. The predetermined value of the engine rpm, which is used for determining the engine start is, for example, 600 rpm.

When the process proceeds to Step S303, the engine control unit 50 then determines whether or not the solenoid power-supply stop control flag F3 described below is "0" and whether or not the engine rpm Ne is smaller than the rpm threshold value Nth. Then, when the engine control unit 50 determines that the solenoid power-supply stop control flag F3 is "0" and the engine rpm Ne is smaller than the rpm threshold value Nth (YES), the process proceeds to next Step S304. On the other hand, when the engine control unit 50 determines that the solenoid power-supply stop control flag F3 is "1" or the engine rpm Ne is equal to or larger than the rpm threshold value Nth (NO), the process proceeds to Step S309.

When the process proceeds to Step S304, the engine control unit 50 turns ON the power supply to the solenoid 21. Further, the engine control unit 50 starts the measurement of the power-supply time T1 of the solenoid 21.

Next, in Step S305, the engine control unit 50 determines whether or not the power-supply time T1 of the solenoid 21 exceeds predetermined time Tpe. Then, when the engine control unit 50 determines that the power-supply time T1 of the solenoid 21 exceeds the predetermined time Tpe, specifically, the pinion gear 24 is pressed against the ring gear 12 to achieve the meshing engagement, the process proceeds to Step S306.

On the other hand, when determining the power-supply time T1 of the solenoid 21 is equal to or shorter than the predetermined time Tpe, specifically, the pinion gear 24 is not in meshing engagement with the ring gear 12 yet, the engine control unit 50 terminates the control described above. The predetermined value Tpe is time required for the pinion gear 24 to come into abutment against the ring gear 12 after the start of the power supply to the solenoid 21, and is, for example, 50 msec.

When the process proceeds to Step S307, the engine control unit 50 resets the automatic stop state flag F2 to "0" because the restart is completed. Next, in Step S308, the engine control unit 50 turns OFF the power supply to the starter motor 23 of the starter 20.

Next, in Step S309, the engine control unit 50 turns OFF the power supply to the solenoid 21 of the starter 20. Further, the engine control unit 50 ends and resets the measurement of the power-supply time T1 of the solenoid 21. In this case, an attraction force is not generated between the solenoid 21 and the plunger 22, and hence the plunger 22 does not move in the axial direction of the rotary shaft of the starter motor 23. As a result, the pinion gear 24 is not pushed in the axial direction, and hence the pinion gear 24 and the ring gear 12 are not engaged with each other.

Figure 6:
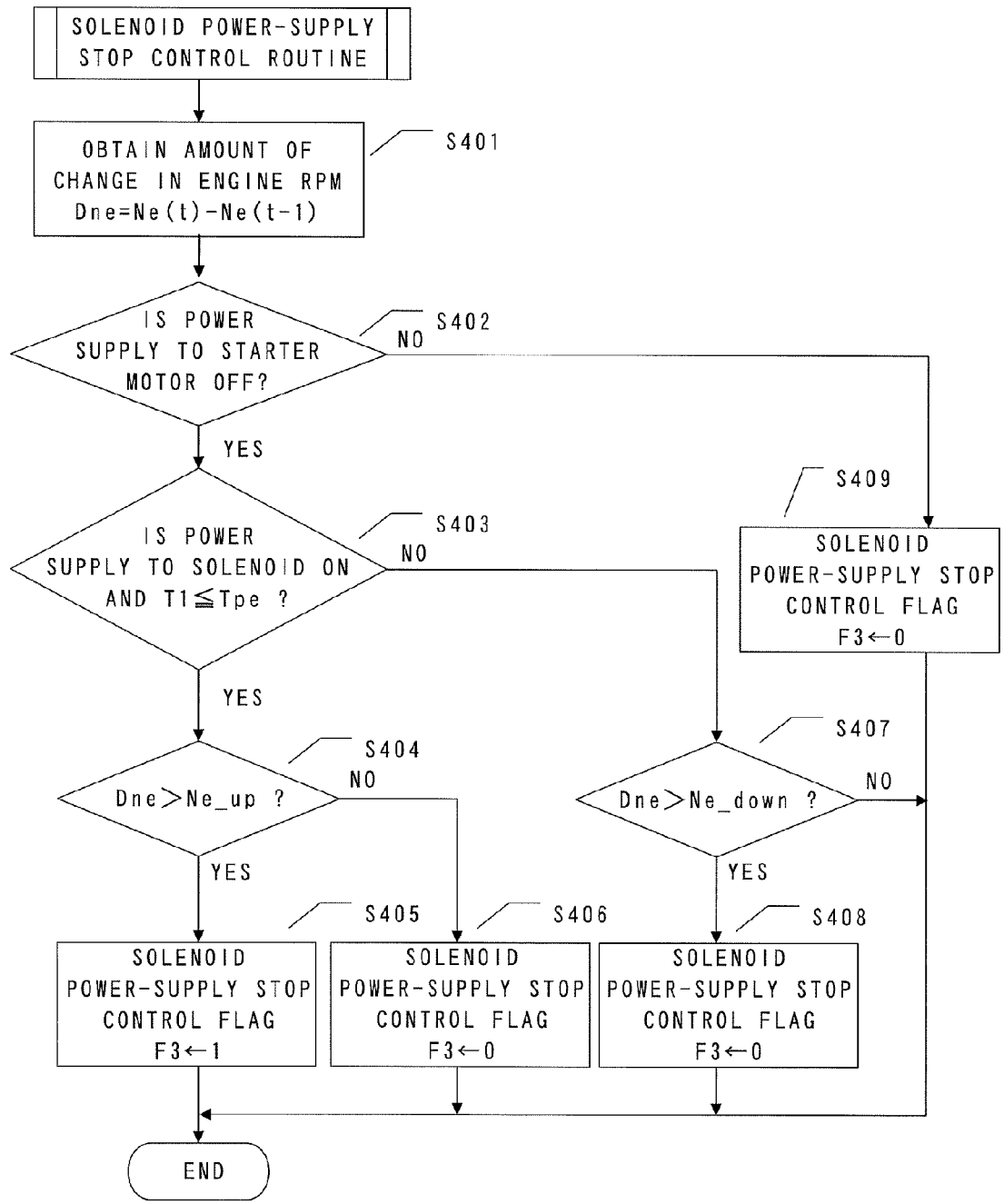
FIG. 6 is a flowchart illustrating a solenoid power-supply stop control routine performed in the engine automatic stop and restart apparatus according to the first embodiment of the present invention.

Next, the details of the solenoid power-supply stop control routine 104 illustrated in FIG. 2 are described referring to FIG. 6. FIG. 6 is a flowchart illustrating the solenoid power-supply stop control routine performed in the engine automatic stop and restart apparatus according to the first embodiment of the present invention. First, in Step S401, the engine control unit 50 obtains an engine-rpm change amount Dne from a deviation between an engine rpm Ne(t) computed based on the detection cycle of the crank-angle sensor 1 and a previous value Ne(t−1) thereof. Then, the process proceeds to Step S402.

Next, in Step S402, the engine control unit 50 determines whether or not the power supply to the starter motor 23 is OFF. When the engine control unit 50 determines that the power supply is OFF (YES), the process proceeds to Step S403. On the other hand, when the engine control unit 50 determines that the power supply to the starter motor 23 is ON (NO), the process proceeds to Step S409.

When the process proceeds to Step S403, the engine control unit 50 determines whether or not the power supply to the solenoid 21 is ON and whether or not the power-supply time T1 of the solenoid 21 is equal to or smaller than the preset predetermined value Tpe. Then, when the result of determination by the engine control unit 50 is YES in Step S403, the process proceeds to Step S404. On the other hand, when the result of determination by the engine control unit 50 is NO in Step S403, the process proceeds to Step S407.

When the process proceeds to Step S404, the engine control unit 50 then determines whether or not the engine-rpm change amount Dne obtained in Step S401 is larger than a preset predetermined rpm Ne_up.

When determining that the engine-rpm change amount Dne is larger than the preset predetermined rpm Ne_up (YES), the engine control unit 50 then determines that the engine rpm is increased by starting the power supply to the solenoid 21 before the pinion gear 24 comes into meshing engagement with the ring gear 12, resulting in a state in which the meshing engagement is difficult to achieve. Therefore, the process proceeds to Step S405.

On the other hand, when determining that the engine-rpm change amount Dne is equal to or smaller than the preset predetermined rpm Ne_up (NO), the engine control unit 50 determines that the pinion gear 24 can come into meshing engagement with the ring gear 12. Therefore, the process proceeds to Step S406.

The predetermined rpm Ne_up used for the determination of the stop of the power supply to the solenoid can be obtained by using the following Formula (1) from a value Th_b obtained from a map Mth_b based on the power-supply time T1 of the solenoid 21, a value Th_vb obtained from a map Mth_vb based on the battery voltage measured by the battery-voltage sensor 5, and a value Th_ag obtained from a map Mth_ag based on the crank angle of the engine detected by the crank-angle sensor 1.

$$Ne\_up = Th\_b + Th\_vb + Th\_ag \quad (1)$$

Figure 7:
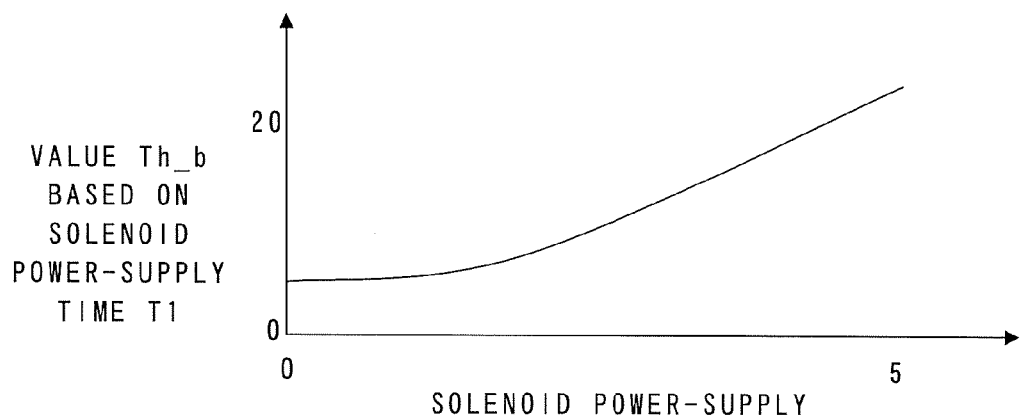
FIGS. 7A to 7C are three types of map used for determining threshold values for detecting an increase in engine rpm in the solenoid power-supply stop control routine performed in the engine automatic stop and restart apparatus according to the first embodiment of the present invention.
Figure 7:
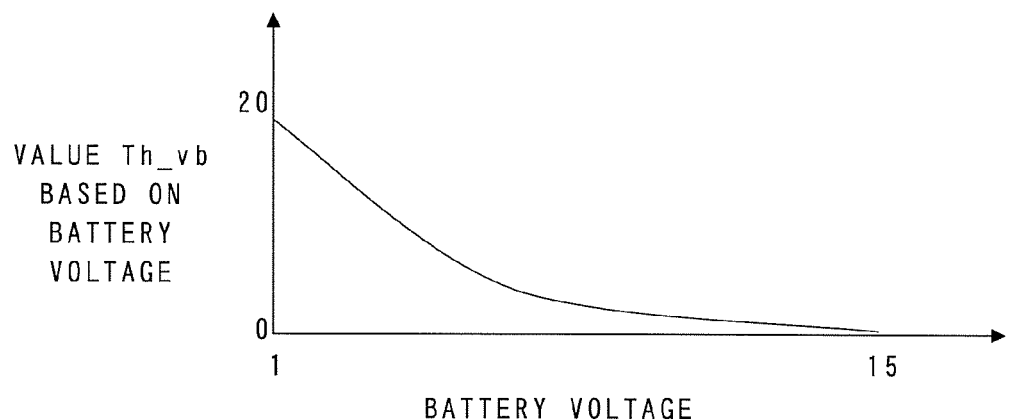
Figure 7:
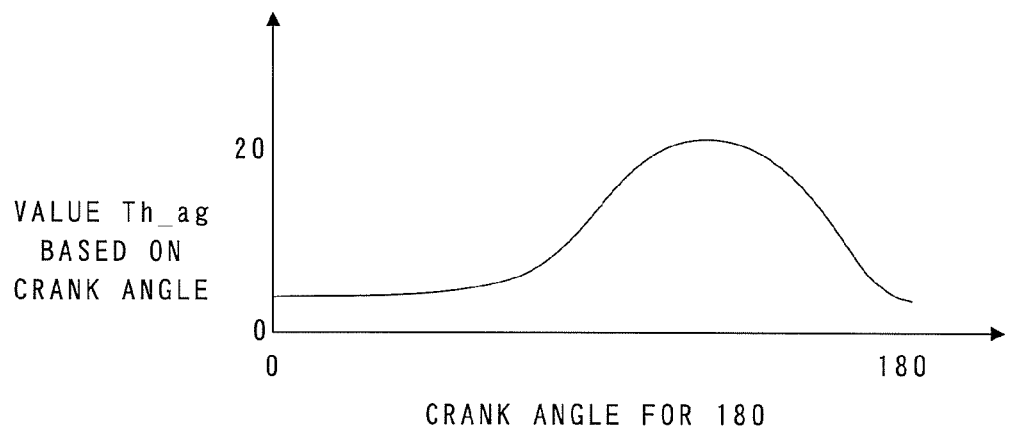

FIGS. 7A to 7C show three types of map used for determining threshold values for detecting an increase in engine rpm of the solenoid power-supply stop control routine performed in the engine automatic stop and restart apparatus according to the first embodiment of the present invention.

FIG. 7A shows the map Mth_b based on the power-supply time T1 of the solenoid 21, which corresponds to a first map. The first map is created in consideration of the fact that, when the power-supply time T1 of the solenoid 21 becomes long, a distance between the pinion gear 24 and the ring gear 12 is reduced so as to avoid a state in which the meshing engagement cannot be achieved unless the amount of increase in engine rpm is large. The first map is previously obtained by an experiment using a vehicle.

FIG. 7B shows the map Mth_vb based on the battery voltage measured by the battery-voltage sensor 5, which corresponds to a second map. The second map is created in consideration of the fact that a force of the pinion gear 24 to press the ring gear 12 is reduced when the battery voltage is lowered, resulting in the smaller rpm which allows the meshing engagement to be achieved. The second map is also previously obtained by an experiment using the vehicle.

FIG. 7C shows the map Mth_ag based on the engine crank angle detected by the crank-angle sensor 1, which corresponds to a third map. The third map is created in consideration of the fact that the amount of change in engine rpm differs in accordance with the crank angle of the engine and the trend of the engine rpm changes to increasing after the passage of the piston through the TDC. The third map is also previously obtained by an experiment using the vehicle.

When the process proceeds to Step S405, the engine control unit 50 sets the solenoid power-supply stop control flag F3 to "1" and then terminates the execution of the solenoid power-supply stop control routine.

On the other hand, when the process proceeds to Step S406, the engine control unit 50 sets the solenoid power-supply stop control flag F3 to "0" and then terminates the execution of the solenoid power-supply stop control routine.

When the process proceeds to Step S407, the engine control unit 50 then determines whether or not the engine-rpm change amount Dne obtained in Step S401 is smaller than a preset predetermined rpm Ne_down.

When determining that the engine-rpm change amount Dne is smaller than the preset predetermined rpm Ne_down (YES), the engine control unit 50 determines that the state of the pinion gear 24 changes again so that the pinion gear 24 can come into meshing engagement with the ring gear 12. Then, the process proceeds to Step S408.

On the other hand, when determining that the engine-rpm change amount Dne is equal to or larger than the preset predetermined rpm Ne_down (NO), the engine control unit 50 terminates the solenoid power-supply stop control routine and continues monitoring.

The preset predetermined rpm Ne_down is an rpm at which the trend of the engine rpm is considered to become decreasing again to allow for the meshing engagement between the pinion gear 24 and the ring gear 12, and is, for example, −10 rpm.

When the process proceeds to Step S408, the engine control unit 50 sets the solenoid power-supply stop control flag F3 to "0" and then terminates the execution of the solenoid power-supply stop control routine.

On the other hand, when the process proceeds to Step S409, the engine control unit 50 sets the solenoid power-supply stop control flag F3 to "0" and then terminates the execution of the solenoid power-supply stop control routine.

Figure 8:
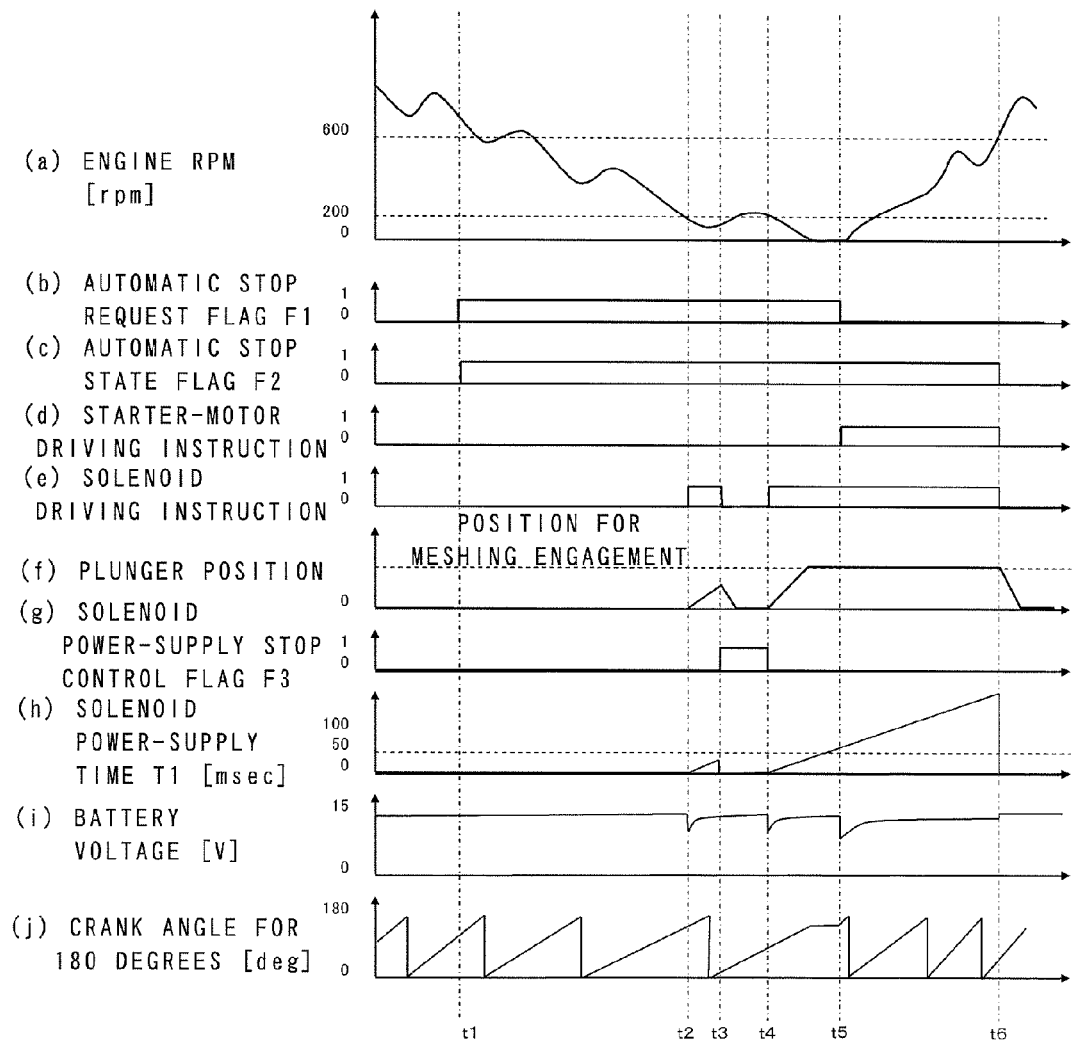
FIG. 8 is a timing chart illustrating an operation of an engine after restart in the engine automatic stop and restart apparatus according to the first embodiment of the present invention.

Next, an operation of the engine automatic stop and restart apparatus of the first embodiment is described along time in the timing chart. FIG. 8 is a timing chart illustrating an operation of the engine after restart with the engine automatic stop and restart apparatus according to the first embodiment of the present invention. Specifically, FIG. 8 shows the following operation. The operation of automatically stopping the engine is performed in a state in which the vehicle is running. While the engine is rotating, the pinion gear 24 and the ring gear 12 are brought into meshing engagement. After that, when the restart condition is satisfied based on the driver's operation, the engine is restarted by cranking of the starter motor 23.

In FIG. 8, part (a) shows a temporal change of the engine rpm Ne. Part (b) shows a state of the automatic stop request flag F1, which is set to "1" when the automatic stop condition is satisfied and is reset to "0" when the restart condition is satisfied. Part (c) shows a state of the automatic stop state flag F2, which is set to "1" when the engine 10 is automatically stopped and currently in a stopped state and is reset to "0" when the start of the engine 10 is completed.

Part (d) shows a temporal change of the power-supply state of the starter motor 23. Part (e) shows a temporal change of the power-supply state of the solenoid 21, specifically, a driven state of the pinion gear 24. Part (f) shows a position of the plunger driven by the power supply to the solenoid 21. Specifically, a position 0 corresponds to an initial state when the power supply to the solenoid 21 is OFF. A dotted line indicates a position at which the pinion gear 24 comes into meshing engagement with the ring gear 12 by the plunger 22 driven by the power supply to the solenoid 21. The position of the plunger 22 is experimentally obtained by using a sensor for the purpose of comparison.

Part (g) shows a temporal change of the solenoid power-supply stop control flag F3. Part (h) shows a temporal change of the time T1 elapsed after the start of the power supply in response to the solenoid power-supply instruction. Part (i) shows a temporal change of the voltage of the battery mounted on the vehicle, which is measured by the battery-voltage sensor 5. Part (j) shows a temporal change of the crank angle of a four-cylinder engine, which is measured by the crank-angle sensor 1 and repeated for 180 degrees with the crank angle at the TDC being 0 degree.

In FIG. 8, an operation series is described in accordance with time t1 to t6. First, at time t1, when the automatic stop condition is satisfied while the vehicle is running, the automatic stop request flag F1 shown in part (b) is set to "1". After the fuel injection is stopped, the automatic stop state flag F2 shown in part (c) is also set to "1" (the operation corresponds to Steps S101 to S103 illustrated in FIG. 3).

Next, at time t2, the engine rpm Ne becomes equal to or smaller than the preset rpm (hereinafter, smaller than 200 rpm). Then, the power supply to the solenoid 21 is started so that the pinion gear 24 and the ring gear 12 are brought into meshing engagement when the engine rpm is in the vicinity of zero (the operation corresponds to Steps S201 and S202 illustrated in FIG. 4).

Next, at time t3, when the amount of increase larger than the preset value is detected based on the engine rpm deviation between the engine rpm Ne and the previous value thereof, the solenoid power-supply stop control flag F3 is set to "1" by the solenoid power-supply stop control routine 104 (the operation corresponds to Steps S401 to S405 illustrated in FIG. 6). Then, the solenoid power-supply instruction is set OFF so as to turn OFF the power supply to the solenoid 21 (the operation corresponds to Steps S201 and S203 illustrated in FIG. 4).

As a result, the position of the plunger is temporarily returned to the initial position. The pinion gear 24 and the ring gear 12 remain in the state in which the meshing engagement cannot be achieved. Therefore, the state in which the pinion gear 24 is pressed against the ring gear 12 is avoided.

Next, at time t4, when the amount of decrease larger than the preset value is detected based on the engine rpm deviation between the engine rpm Ne and the previous value thereof, the solenoid power-supply stop control flag F3 is set to "0" by the solenoid power-supply stop control routine 104 (the operation corresponds to Steps S401 to S403, S407 and S408 illustrated in FIG. 6). Then, the solenoid power-supply instruction is set again ON so as to start the power supply to the solenoid 21 (the operation corresponds to Steps S201 and S202 illustrated in FIG. 4). As a result, the meshing engagement between the pinion gear 24 and the ring gear 12 is completed.

Next, at time t5, the engine automatic stop request flag F1 is set to "0" by the engine automatic stop routine 101 based on the driver's operation. Then, the restart of the engine is stared to start the power supply to the starter motor 23.

Next, at time t6, the engine rpm becomes equal to or larger than the engine start completion criterion rpm, that is, 600 rpm, by the fuel combustion. The restart of the engine is completed, and the starter motor 23 and the solenoid 21 are de-energized.

Figure 9:
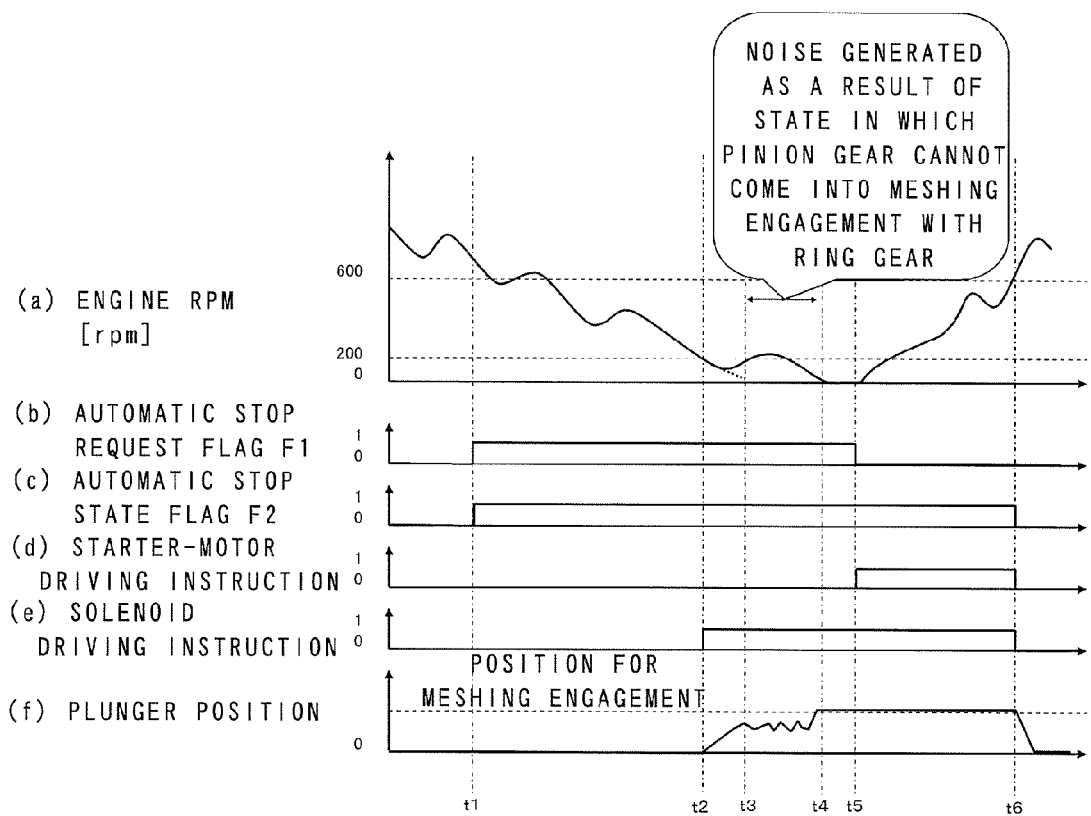
FIG. 9 is a timing chart illustrating an operation of a conventional engine automatic stop and restart apparatus.

On the other hand, FIG. 9 is a timing chart illustrating an operation of a conventional automatic stop and restart apparatus, specifically, a timing chart of the conventional apparatus disclosed in Japanese Patent Application Laid-open No. 2010-276035 cited above. In the case of the conventional apparatus described in Japanese Patent Application Laid-open No. 2010-276035, the piston of the engine is determined to be at the last TDC after the operation of automatically stopping the engine is performed, as illustrated in FIG. 9. In the interval in which the engine rpm is on a decreasing trend, the engine rpm is predicted. Then, the control is performed so that the pinion gear and the ring gear are brought into abutment against each other when or immediately before the engine rpm becomes zero based on the meshing-engagement operation time required for the meshing operation of the pinion gear.

In the conventional apparatus described in Japanese Patent Application Laid-open No. 2010-276035, whether or not the piston of the engine is at the last TDC is determined so as to determine the interval in which the engine rpm is on a decreasing trend. For precisely determining the last TDC, it is necessary to perform the determination in view of the load state of the engine, the change of the engine with time, and the like by the engine control unit for controlling the engine.

For example, if the load on the engine fluctuates after the determination that the piston of the engine is at the last TDC, the degree of decrease in engine rpm becomes smaller. Then, after the piston passes through the TDC immediately before the engine is stopped, the engine rpm increases (see time t3 shown in FIG. 9). As a result, at timing at which the pinion gear comes into meshing engagement with the ring gear, the engine rpm does not become zero or is not in the vicinity thereof. Thus, the meshing engagement between the pinion gear and the ring gear is not completed unless the engine rpm is on a decreasing trend again (see a time period between time t3 and t4 shown in FIG. 9).

Thus, there is a problem in that noise is generated before the completion of the meshing engagement between the pinion gear and the ring gear. On the other hand, according to the engine automatic stop and restart apparatus of the first embodiment, the above-mentioned problem of the conventional apparatus is solved.

As described above, in the case where the operation of automatically stopping the engine is performed so that the pinion gear is brought into meshing engagement with the ring gear immediately before the engine is stopped, the power supply to the solenoid is temporarily stopped when the increase in engine rpm is detected before the time at which the achievement of meshing engagement of the pinion gear is determined after the start of the power supply to the solenoid. By performing the above-mentioned control, the pinion gear is controlled so as not to be pressed against the ring gear in a state in which the pinion gear cannot come into meshing engagement with the ring gear. Therefore, the generation of noise is suppressed. As a result, the pinion gear and the ring gear can be prevented from being worn.

Moreover, in the engine automatic stop and restart apparatus according to the first embodiment of the present invention, the criterion value for detecting the increase in engine rpm is determined in consideration of the power-supply time of the solenoid. Therefore, unexpected stop of the power supply immediately before the completion of the meshing engagement can be prevented. As a result, the restart time can be prevented from being delayed due to delayed meshing engagement between the pinion gear and the ring gear.

Further, in the engine automatic stop and restart apparatus according to the first embodiment of the present invention, the criterion value for detecting the increase in engine rpm is determined in consideration of the battery voltage of the battery for supplying power to the solenoid. Therefore, even if the force for pressing the pinion gear against the ring gear is reduced when the battery voltage is lowered to lower the rpm at which the meshing engagement can be achieved, the power supply to the solenoid can be stopped with high precision. As a result, the generation of noise is suppressed, and hence the pinion gear and the ring gear can be prevented from being worn.

Further, in the engine automatic stop and restart apparatus according to the first embodiment of the present invention, the criterion value for detecting the increase in engine rpm is determined in consideration of the crank angle of the engine. Therefore, even if the engine rpm is abruptly increased immediately after the crank angle of the engine passes through the TDC, the power supply to the solenoid can be stopped with high precision. As a result, the generation of noise is suppressed, and hence the pinion gear and the ring gear can be prevented from being worn.

For Formula (I) described above, the case where the predetermined rpm Ne_up used for the determination of the stop of power supply to the solenoid is obtained in consideration of all the first to third maps has been described. However, the present invention is not limited thereto. The predetermined rpm Ne_up can be obtained by any one of the first to third maps or a combination of any two thereof so as to obtain the effects of suppressing noise and preventing wearing.

What is claimed is:

1. An engine automatic stop and restart apparatus for performing automatic stop control for an engine when an automatic stop condition is satisfied while a vehicle is running and performing restart control for the engine when a restart condition is thereafter satisfied, the engine automatic stop and restart apparatus comprising:
   a ring gear provided to a crankshaft of the engine;
   a pinion gear for transferring rotation of a starter motor for starting the engine to the ring gear;
   pinion-gear moving means for moving the pinion gear by power supply so as to achieve meshing engagement with the ring gear; and
   an engine control section for performing the automatic stop control and the restart control based on an rpm of the engine,
   wherein the engine control section is configured to:
      start the power supply to the pinion-gear moving means when the rpm of the engine becomes smaller than an rpm at which the meshing engagement between the pinion gear and the ring gear is possible while the engine is rotating by inertia as a result of satisfaction of the automatic stop condition;
      temporarily stop the power supply to the pinion-gear moving means when an increase in the rpm of the engine is detected based on a fact that an amount of change in the rpm of the engine exceeds a predetermined increase detection threshold value before time required for the pinion gear to come into abutment against the ring gear elapses after the start of the power supply to the pinion-gear moving means; and
      restart the power supply to the pinion-gear moving means when a decrease in the rpm of the engine is detected based on a fact that the amount of change in the rpm of the engine becomes smaller than a predetermined decrease detection threshold value after the power supply to the pinion-gear moving means is temporarily stopped.

2. An engine automatic stop and restart apparatus according to claim 1, wherein the engine control section includes, in advance, a first map for variably setting the predetermined increase detection threshold value in accordance with time elapsed after the start of the power supply to the pinion-gear moving means, and uses the predetermined increase detection threshold value set in accordance with the elapsed time to detect that the rpm of the engine has been increased.

3. An engine automatic stop and restart apparatus according to claim 2, further comprising a battery-voltage detection sensor for detecting a voltage value of a battery,
   wherein the engine control section includes, in advance, a second map for variably setting the predetermined increase detection threshold value in accordance with the voltage value of the battery detected by the battery-voltage detection sensor, and uses the predetermined increase detection threshold value set in accordance with the voltage value of the battery to detect that the rpm of the engine has been increased.

4. An engine automatic stop and restart apparatus according to claim 3, further comprising a crank-angle sensor for detecting a crank angle of the engine,
   wherein the engine control section includes, in advance, a third map for variably setting the predetermined increase detection threshold value in accordance with the crank angle detected by the crank-angle sensor, and uses the predetermined increase detection threshold value set in accordance with the crank angle to detect that the rpm of the engine has been increased.

5. An engine automatic stop and restart apparatus according to claim 2, further comprising a crank-angle sensor for detecting a crank angle of the engine,
   wherein the engine control section includes, in advance, a third map for variably setting the predetermined increase detection threshold value in accordance with the crank angle detected by the crank-angle sensor, and uses the predetermined increase detection threshold value set in accordance with the crank angle to detect that the rpm of the engine has been increased.

6. An engine automatic stop and restart apparatus according to claim 1, further comprising a battery-voltage detection sensor for detecting a voltage value of a battery,
   wherein the engine control section includes, in advance, a second map for variably setting the predetermined increase detection threshold value in accordance with the voltage value of the battery detected by the battery-voltage detection sensor, and uses the predetermined increase detection threshold value set in accordance with the voltage value of the battery to detect that the rpm of the engine has been increased.

7. An engine automatic stop and restart apparatus according to claim 6, further comprising a crank-angle sensor for detecting a crank angle of the engine,
   wherein the engine control section includes, in advance, a third map for variably setting the predetermined increase detection threshold value in accordance with the crank angle detected by the crank-angle sensor, and uses the predetermined increase detection threshold value set in accordance with the crank angle to detect that the rpm of the engine has been increased.

8. An engine automatic stop and restart apparatus according to claim 1, further comprising a crank-angle sensor for detecting a crank angle of the engine,
   wherein the engine control section includes, in advance, a third map for variably setting the predetermined increase detection threshold value in accordance with the crank angle detected by the crank-angle sensor, and uses the predetermined increase detection threshold value set in accordance with the crank angle to detect that the rpm of the engine has been increased.

9. An engine automatic stop and restart method to be used for an engine automatic stop and restart apparatus for performing automatic stop control for an engine when an automatic stop condition is satisfied while a vehicle is running and performing restart control for the engine when a restart condition is thereafter satisfied,
   the engine automatic stop and restart apparatus comprising:
      a ring gear provided to a crankshaft of the engine;
      a pinion gear for transferring rotation of a starter motor for starting the engine to the ring gear;
      pinion-gear moving means for moving the pinion gear by power supply so as to achieve meshing engagement with the ring gear; and
      an engine control section for performing the automatic stop control and the restart control based on an rpm of the engine,
   the engine automatic stop and restart method comprising:
      a first step of starting the power supply to the pinion-gear moving means when the rpm of the engine becomes smaller than an rpm at which the meshing engagement between the pinion gear and the ring gear is possible while the engine is rotating by inertia as a result of satisfaction of the automatic stop condition;

a second step of temporarily stopping the power supply to the pinion-gear moving means when an increase in the rpm of the engine is detected based on a fact that an amount of change in the rpm of the engine exceeds a predetermined increase detection threshold value before time required for the pinion gear to come into abutment against the ring gear elapses after the start of the power supply to the pinion-gear moving means in the first step; and a third step of restarting the power supply to the pinion-gear moving means when a decrease in the rpm of the engine is detected based on a fact that the amount of change in the rpm of the engine becomes smaller than a predetermined decrease detection threshold value after the power supply to the pinion-gear moving means is temporarily stopped in the second step.

* * * * *